C. B. KENNEDYE

April 19, 1932. ROTARY WELL DRILLING TOOL Re. 18,434

Original Filed March 3, 1927 2 Sheets-Sheet 1

Witness:
Stephen A. Nelson

Inventor:
Charles B. Kennedye
by Frank A. Bellamy
Atty.

C. B. KENNEDYE

April 19, 1932. ROTARY WELL DRILLING TOOL Re. 18,434

Original Filed March 3, 1927 2 Sheets-Sheet 2

Witness:
Stephen T. Pelora

Inventor:
Charles B. Kennedye,
by Frank L. Belknap
Atty.

Reissued Apr. 19, 1932

Re. 18,434

UNITED STATES PATENT OFFICE

CHARLES B. KENNEDYE, OF UNIVERSITY CITY, MISSOURI, ASSIGNOR TO THE KENNEDYE CORPORATION, OF WILMINGTON, DELAWARE, A CORPORATION OF DELAWARE

ROTARY WELL-DRILLING TOOL

Original No. 1,786,414, dated December 23, 1930, Serial No. 172,248, filed March 3, 1927. Application for reissue filed July 17, 1931. Serial No. 551,503.

The present improvements relate more particularly to a well drilling tool of the rotary type in which drilling elements are adapted to have cooperative removable engagement with a suitable supporting head.

As a feature of the present invention, side reamers and drilling blades may be incorporated in a single head, in order to simultaneously drill from the base of the head and ream from the side thereof, thus insuring the drilling of a straighter hole and one that is true to gauge.

Another feature of the invention comprises the provision of longitudinal and separate communicating transverse slots opening to the sides and base of said head respectively into which said reamer and drilling blades are adapted to be inserted. The drilling blades projecting from the base of the head are provided with cutting or drilling edges. Two or more pairs of reamers and drilling bits may be mounted on the same head, preferably equally spaced around the circumference or width of the bit supporting portion of the head.

As another feature of the invention, the inner ends of the drilling blades projecting below the base of the heads over-lap in order to prevent packing of small particles disengaged in drilling since it might tend to slow down the operation.

As another feature of the present invention, the water or other liquid medium used is delivered to the extreme side edges of the head at the base thereof, the arrangement being such, that since the bit will wear away in a substantially horizontal line, when the bit has worn to the point of inefficiency, that is, practically up to the base of the head, the water or other liquid medium will back up and will automatically shut off a pump which forces it into the well.

The utility, advantages, and objects of the present invention will be more particularly brought out in the following description.

In the drawings, Fig. 1 is a diagrammatic elevational view of the rotary drilling tool of the present invention.

Figure 1:
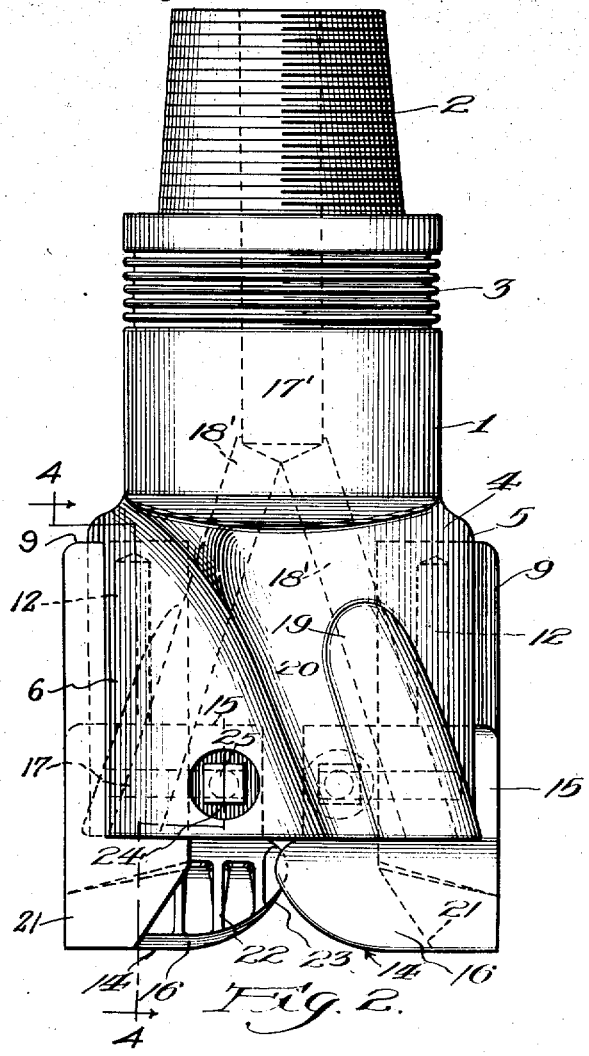
Figure 2:
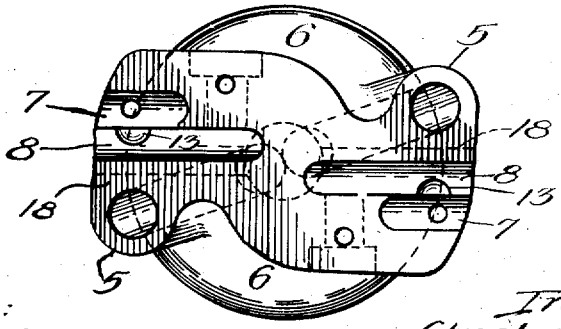
Fig. 2 is a bottom plan view of the head with the reamers and drilling bits removed.

Referring in detail to the drawings, 1 designates an intermediate supporting body which is illustrated as circular in cross section, from the upper end of which projects the screw threaded pin 2, adapted for engagement with the drill collar. The intermediate supporting body 1 may be provided with the circular ribs 3, which are adapted to provide gripping surface for a fishing tool in case the pin end 2 should be twisted off, which sometimes occurs, due to strain. From the lower end of the intermediate supporting body projects a bit and reamer supporting portion 4, which in the present instance simulates in shape, a fish tail, provided with the alternate outwardly projecting portions 5 and the inwardly cutaway portions 6. The portions 5 are provided with the longitudinal slots 7 opening to the sides thereof and separate communicating transverse slots 8 which open also to the base thereof. Reaming elements designated at 9 may be mounted in the longitudinal side slots 7, portions of which reaming elements project beyond the walls of the projections 5 and below the base thereof. In use and operation the portions of the reamer which project beyond the wall of the head are adapted to present elongated relatively thin reaming surfaces to the formation being drilled and in the present instance, may comprise a plurality of cutting edges illustrated at 10, (Fig. 4), separated by the longitudinal recess 11. These reamers may be provided on one surface with locking lugs 12 adapted to have engagement with the grooves 13 in the walls confining the slots 7, for the purpose of locking the reamer in slots 7.

Mounted directly adjacent the lower end of each reamer and contacting therewith is a drilling bit 14, which comprises a supporting portion 15 mounted in the head and a drilling blade 16 projecting from the base thereof. In the drawings, this blade 16 is illustrated as off-set from the plane of the supporting body 15, but it is to be noted that this blade 16 may or may not be offset. On one surface thereof there may be provided a locking nut 17 adapted to register with a groove 18 in the wall defining the transverse recess.

A water channel 17′ divides into branches 18′, which discharge the water at the base of the head immediately adjacent the side walls of the projections 5 and directly at the point of contact between the cutting edge of the cutting blade 16 and the formation being drilled. The delivery of water at this particular point has a two-fold purpose, namely, cooling the drilling blade and assisting in forcing the cuttings to be discharged.

As a feature of the present invention, the walls defining the branches 18′ are raised above the transverse plane of the bit supporting portion 4 as indicated at 19 forming the open channels or passage-ways 20, which curve upwardly from the base of the head and outwardly from the sides to facilitate the passage and removal of the cuttings and water.

Figure 3:
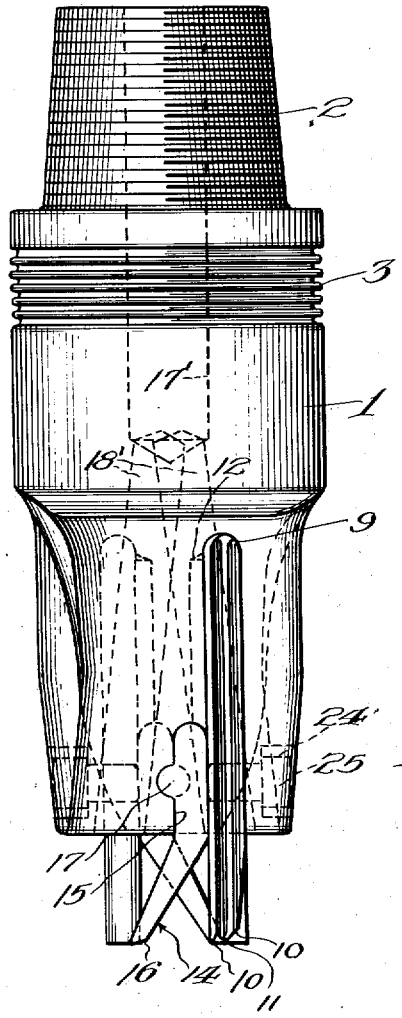
Fig. 3 is a side elevational view.

As indicated in Figs. 1 and 3 of the drawings, the edges of both the reamer 9 and drilling bit 14, project beyond the side of the head and into the formation being drilled, thus increasing the reaming surface which is presented to the formation and resulting in the drilling of a hole true to gauge. The lower end of the reamer 9 may be provided with the cutting blade 21, which if desired may be materially decreased in thickness and width. The drilling bit 14 may be, if desired, materially reduced in thickness and provided with the reinforcing ribs 22.

As a feature of the present invention, the inner edges or sides of the drilling bit 14, overlap as illustrated at 23 (Fig. 1), for the purpose of preventing the packing of material removed in the drilling operation, which if permitted to pack in this space between the inner side edges of the drilling bit, might materially cut down the speed or even stop the rotation of the drilling tool.

Figure 4:
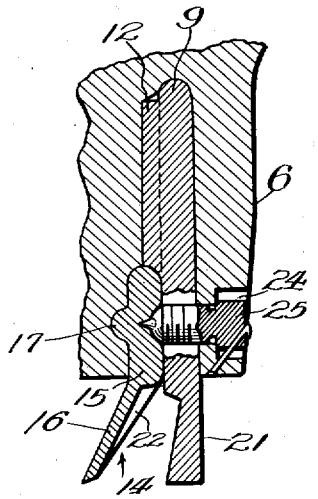
Fig. 4 is a fragmentary cross section view taken on line 4—4 of Fig. 1.

The lower body may be provided with the apertures 24 for the reception of the locking screws 25 which pass through the body and into a recess in the surface of the drilling bit 14, as indicated clearly in Fig. 4. It is obvious that various changes may be made in the device without departing from the scope of the invention.

For the purpose of providing a good support and to prevent accidental displacement, the lower end of the rib 12 may be cut away and rounded to abut against the upper rounded edge of the drilling bit 14.

I claim as my invention:

1. A rotary well drilling tool comprising in combination a supporting head provided with spaced sets of slots, each set comprising a longitudinal slot and a communicating transverse slot opening respectively to a side and to the base of the head, reamers adapted to have removable cooperative engagement with said head in said longitudinal slots, each reamer having an elongated relatively thin side reaming surface projecting beyond the side wall of the head, drilling bits also adapted to have removable cooperative engagement with said head in said transverse slots, each having a main face disposed in contact with a main face of an adjacent reamer, said drilling bits having cutting edges projecting from the base of said head, the inner edges of the projecting portions of the drilling bits overlapping in transverse section, said reamers being provided with cutting edges on their lower end to simultaneously drill on the bottom of the hole being drilled by the drilling bits, and so disposed as to rotate in the same circular plane as the drilling bits.

2. A rotary well drilling tool comprising in combination a supporting head provided with longitudinal slots communicating with offset transverse slots opening respectively to the sides and base of the head, reamers adapted to have removable cooperative engagement with said head in said longitudinal slots, drilling bits also adapted to have removable cooperative engagement with said head in said transverse slots, and disposed in contact with said reamers, said drilling bits having cutting edges projecting from the base of said head, and screw threaded pins projecting through apertures in the head and cooperatively engaging the drilling bits to lock the reamer and drilling bits in the head.

3. A well drilling tool, including in combination, a head having longitudinal apertures extending inwardly from its sides, said apertures being open at the base of the head, reamers removably mounted in said longitudinal apertures and projecting beyond the base of the head, cutting elements removably mounted in the head each having a main face disposed in contact with a main face of an adjacent reamer, a shoulder formed in each reamer adapted to contact the upper edge of each cutting element, and means for locking the cutting element in the head.

4. A rotary well drilling tool, comprising in combination a supporting head provided with longitudinal slots and separate but communicating transverse slots opening respectively to the sides and to the base of the head, said longitudinal slots being closed at their upper ends, reamers, each having a body portion and a reaming surface, adapted to have removable cooperative engagement with said head in said longitudinal slots in such manner as to permit only a relatively small portion of each reamer, including the reaming surface thereof, to project beyond the side walls of said head, drilling bits also adapted to have removable cooperative engagement with said head in said transverse slots, each having a main surface disposed in contact with a main surface of an adjacent reamer, said drilling bits having cutting edges projecting from the base of said head, the inner edges of the projecting portions of the drilling bits overlapping in transverse section and means associated with the reamers adapted for engagement with both the head and the drilling bits for detachably securing said reamers from unintentional sidewise displacement, said reamers being insertable in said head only by forcing said reamers upwardly in said head, each reamer being cut away to contact and be supported by the adjacent drilling bit, which latter is sidewise removably mounted in said head whereby each drilling bit must be removed from the head before the adjacent reamer can be removed.

5. A rotary well drilling tool, comprising in combination a supporting head provided with longitudinal slots and separate but communicating transverse slots opening respectively to the sides and to the base of the head, said longitudinal slots being closed at their upper ends, reamers, each having a body portion and a reaming surface, adapted to have removable cooperative engagement with said head in said longitudinal slots in such manner as to permit only a relatively small portion of each reamer, including the reaming surface thereof, to project beyond the side walls of said head, drilling bits also adapted to have removable cooperative engagement with said head in said transverse slots, each having a main surface disposed in contact with a main surface of an adjacent reamer, said drilling bits having cutting edges projecting from the base of said head, the inner edges of the projecting portions of the drilling bits overlapping in transverse section, and means associated with the reamers adapted for engagement with both the head and the drilling bits for detachably securing said reamer from unintentional sidewise displacement, each reamer being insertable upwardly in said head until the upper edge of said reamer abuts against the wall closing the upper end of the longitudinal slot, an integral rib projecting from a face of each reamer adapted to register with the head to prevent sidewise displacement of said reamer, said reamers being cut away to contact and be supported by the drilling bit to prevent accidental longitudinal displacement.

6. A supporting head for use with a rotary drilling tool, comprising an intermediate supporting body, a screw threaded pin projecting from one end thereof and a bit supporting portion from the opposite end, portions of the outer edge of the bit supporting portion projecting beyond the outer wall of the intermediate supporting body, other portions of said bit supporting body being inwardly cut away and lying within said wall, longitudinal side slots and communicating transverse slots opening respectively to the sides and base of said bit supporting portion, and water channels opening at substantially the base of the latter immediately adjacent the outer edges, the outer wall defining the water channels being raised above the surface of the bit supporting portion to define open channels curving upwardly from the base and outwardly to the sides to facilitate passage of water and cuttings.

7. A supporting head for use with a rotary drilling tool, comprising an intermediate supporting body, a screw threaded pin projecting from one end thereof and a bit supporting portion from the opposite end, portions of the outer edge of the bit supporting portion projecting beyond the outer wall of the intermediate supporting body, other portions of said bit supporting body being inwardly cut away and lying within said wall, longitudinal side slots and communicating transverse slots opening respectively to the sides and base of said bit supporting portion, and water channels opening at substantially the base of the latter immediately adjacent the outer edges, the bit supporting portion being grooved to define an open channel curving upwardly from the base and outwardly to the side to facilitate the upward passage of water and cuttings.

CHARLES B. KENNEDYE.